Dec. 16, 1924.

J. W. HORTON 1,519,619

HARMONIC GENERATOR SYSTEM

Filed Dec. 23, 1920  2 Sheets-Sheet 1

Inventor:
Joseph W. Horton.

by C. C. Sprague. Atty.

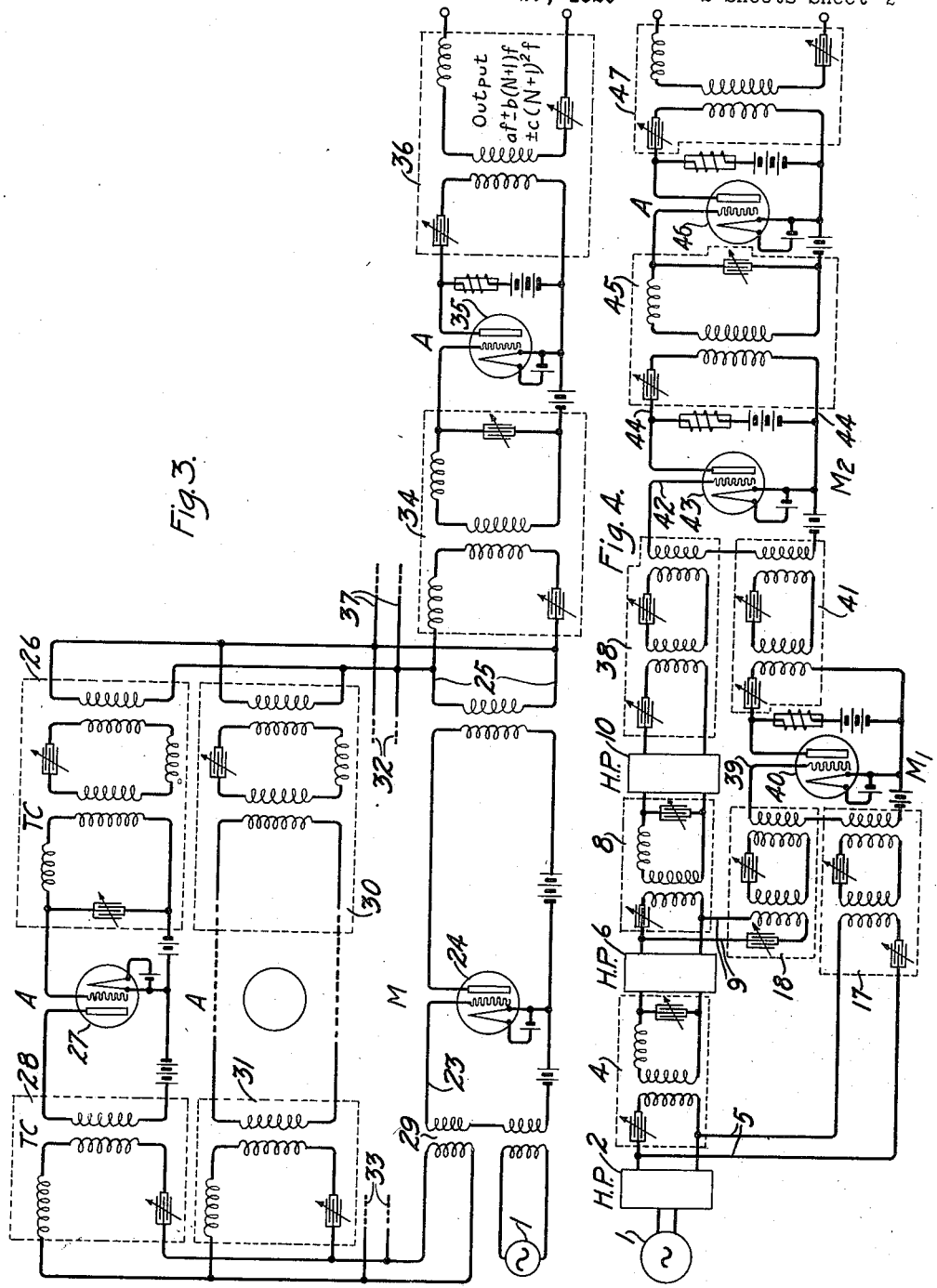

Patented Dec. 16, 1924.

1,519,619

UNITED STATES PATENT OFFICE.

JOSEPH W. HORTON, OF EAST ORANGE, NEW JERSEY, ASSIGNOR TO WESTERN ELECTRIC COMPANY, INCORPORATED, OF NEW YORK, N. Y., A CORPORATION OF NEW YORK.

HARMONIC GENERATOR SYSTEM.

Application filed December 23, 1920. Serial No. 432,646.

*To all whom it may concern:*

Be it known that I, JOSEPH W. HORTON, a citizen of the United States, residing at East Orange, in the county of Essex, State of New Jersey, have invented certain new and useful Improvements in a Harmonic Generator System, of which the following is a full, clear, concise, and exact description.

This invention relates to the production of any required harmonic frequency wave, or a series of such waves from a given sine wave of fundamental frequency. The fundamental wave is obtained from a source of known or standard frequency while the harmonic wave is produced by passing the wave disturbance derived from the fundamental wave through a progressive series of operations which involve breaking up or distorting the wave, and synthesizing or uniting certain of the resulting wave components to form the required waves.

One object of the invention is to produce a series of waves having different frequencies separated by an accurate and constant frequency interval, a condition very essential in multiplex carrier wave systems.

Another object is to provide a source of waves of harmonic frequency covering a range extending from the frequency of the fundamental up to any desired frequency value with a minimum amount of apparatus and circuits.

A still further object is to generate a wave of any desired frequency having a definite frequency ratio to that of some standard, or known frequency, such as a calibrated tuning fork or other source of constant frequency.

It is old in the art to arrange frequency multipliers in tandem to provide a wave of high frequency, but such systems can provide only certain values of frequency separated by inconvenient frequency intervals. In order to provide waves of all harmonic frequencies, ranging from the fundamental frequency to the highest harmonic produced, it is here proposed to produce a series of waves harmonic to the fundamental wave and to then combine a number of these harmonic waves, so as to produce all possible harmonics, or desired harmonics within a given range, the apparatus for accomplishing this result being relatively simple and requiring a minimum number of elements.

In accordance with this invention, use is made of a tandem arrangement of distorting devices such as thermionic tubes, although any suitable type of distorting device may be employed. Waves selected from the various distorting stages in the tandem connection are combined by a modulating device, the synthetic waves so produced including not only waves having the frequency of those impressed on the modulator, but also all harmonics, or any desired harmonics of the fundamental wave covering a range intermediate between the impressed waves.

The modulating device may be of substantially the same type as the distorting device inasmuch as use is made of the distorting characteristic in both of these devices. By arranging part of a given number of distorting devices in tandem connection, and the remainder of the distorters as modulators, a larger number of harmonics may be produced than if the distorters were all arranged in tandem; or, conversely, to produce a given series of harmonics, a combination of distorters in tandem in conjunction with one or more modulators may not require as many distorting devices as would be necessary if all the distorters were in simple tandem relation to each other.

Other objects will be apparent from the more detailed description of the invention.

Referring to the drawings: Fig. 1 is a diagram showing one modification of the invention employing a tandem connection of distorting devices so connected to a modulator as to produce in the output circuit of the modulator all frequencies ranging from the fundamental up to the highest harmonic produced;

Fig. 3 is a diagram of a modification utilizing a single distorting tube for performing the function of several distorters or modulators;

Fig. 4 is a diagram showing an alternative method to that of Figs. 1 and 2, of arranging the distorting and modulating devices.

Figure 1:
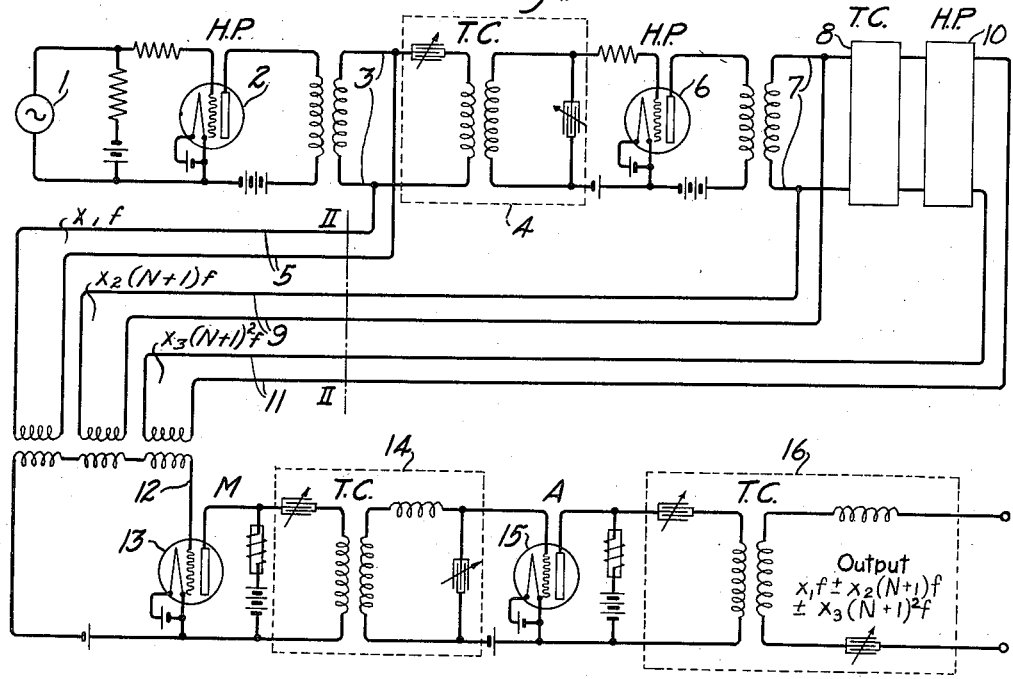

In Fig. 1, the source of oscillations 1 is connected with the harmonic producer 2 indicated as H. P. whose output circuit 3 includes two parallel branch circuits 4 and 5, one of which, 4, is tuned as indicated by T. C. to the frequency of either the highest harmonic produced in the tube 2, or some convenient harmonic such as the ninth harmonic of the fundamental wave. The other branch 5 of the output circuit will be referred to later on in the specification. To the tuned circuit 4 is connected a second harmonic producer 6 whose output circuit 7 is arranged similarly to that of the first harmonic producer tube, being provided with two branches, one branch 8 of which is tuned, the other branch 9 being described later on in the specification. A third harmonic producer 10 is connected to the tuned circuit 8. Additional harmonic producers may be connected in tandem with the harmonic producer 10, the tuned circuits intervening between adjacent harmonic producers in the manner already described with reference to harmonic producers 2, 6 and 10.

The output circuit 11 of the harmonic producer 10 is inductively connected to the grid circuit 12 of the modulator 13 indicated as M. In addition to the circuit 11, the branch circuits 5, 9, are inductively connected to the grid circuit 12. The output circuit 14 of the modulator 13 is tuned to some harmonic frequency which it is desired to select, and is connected through the amplifier 15 to another circuit 16 tuned to the same frequency as circuit 14 and permitting of a sharp selection of a desired frequency.

The operation of the circuit shown in Fig. 1 is as follows: a wave of fundamental frequency originating at the source 1 is distorted or broken up by the harmonic producer 2, in a manner well known in the art, into a plurality of waves having frequencies harmonic to that of the fundamental wave. The tuned circuit 4 is adjusted to be resonant to some one of the component waves which make up the distorted wave in the output circuit of the harmonic producer 2. In effect, the tuned circuit 4 then becomes a source of single frequency waves which are applied to the harmonic producer 6 in the same manner as waves originating at the source 1 were applied to the harmonic producer 2.

Assuming that each harmonic producer produces N harmonics of the wave impressed thereon, there will be N harmonics produced in the producer 2, and if the tuned circuit 4 selects the Nth harmonic from the distorted wave, the harmonic producer 6 will produce N harmonics of the wave impressed thereon, thus giving rise to a wave containing N harmonics of a wave having $(N+1)$ times the frequency of the source 1, and the highest frequency will be $(N+1)^2$ times that of the wave from the source 1. If the frequency of the wave from the source 1 be designated as $f$, and the tuned circuit 8 be tuned to transmit the wave of frequency $(N+1)^2f$, the wave produced in the output circuit of the harmonic producer 10 will contain N harmonics of a wave of frequency $(N+1)^2f$, thus giving rise to harmonics of frequency as high as $(N+1)^3f$. In a manner similar to that described with reference to harmonic producers 2, 6 and 10, the scale of harmonics may be extended by inserting additional harmonic producers, and intermediate tuned circuits in the tandem connection. The output circuit of the last harmonic producer in the tandem connection will contain a harmonic equal to the frequency of the source 1 multiplied by $(N+1)$ raised to a power corresponding to the number of harmonic producers.

The branch circuit 5 contains N harmonics of a fundamental wave having a frequency $f$; branch circuit 9 contains N harmonics of a wave having a frequency $(N+1)f$; branch 11 contains N harmonics of a wave having a frequency $(N+1)^2f$, while other branches extending from additional harmonic producers which might be inserted in the tandem connection would provide N harmonics of the waves impressed upon the individual harmonic producers.

If the waves having the frequencies $p$, $q$, $r$, $s$, etc. are impressed upon any modulating system, there will be present in the output wave, components of the frequency $\pm ap \pm bq \pm cr \pm ds \pm -$, where any of the coefficients may be zero, or a whole number such as 1, 2, 3, etc. The order of modulation producing any given component is defined as being the sum of the coefficients $a$, $b$, $c$, $d$, etc. for that component. For example, where wave frequencies $p$, $q$, and $r$ are transmitted to a modulator and one of the sine wave output components has a frequency $f=(1\times p)+(1\times q)+(1\times r)$, the order of modulation which produces said component is $m=1+1+1=3$; similarly if $f=(3\times p)+(0\times q)+(0\times r)$, $m=3+0+0=3$; if $f=(0\times p)+(0\times q)+(2\times r)$, $m=2$, and so on.

The modulator 13 should be capable of modulating to an order of modulation corresponding to the number of input circuits such as 5, 9, and 11. Waves applied through the various branches 5, 9, 11, etc., form a resultant wave in the output circuit of the modulator 13, containing in addition to the harmonic waves impressed upon the modulator 13, all possible intermediate harmonic frequencies. There are also produced in the output circuit of the modulator 13, harmonic waves of frequency considerably in excess of the impressed harmonics, these higher harmonics being limited in frequency only by the order of modulation of the modulator 13.

If the distorted or complex wave flowing in the circuit 5 be designated as $x_1 f$, the distorted wave in the circuit 9 as $x_2 (N+1)f$, and the distorted wave in the circuit 11 as $x_3(N+1)^2 f$, a wave may be selected from the output circuit of the modulator 13 of a frequency which may be designated as $x_1 f \pm x_2 (N+1)f \pm x_3 (N+1)_2 f$. The intermodulation of the waves supplied by the harmonic producers thus gives rise to waves of the same frequency as those supplied by the harmonic producers, and in addition thereto gives rise to all possible intermediate harmonics of the fundamental wave $f$.

Figure 2:
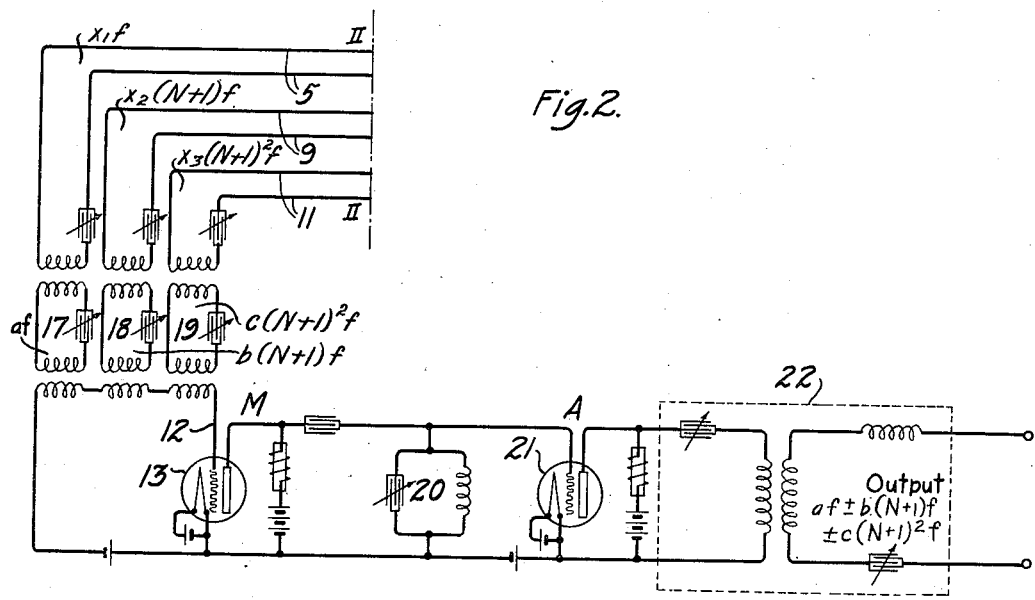
Fig. 2 shows a modification of a portion of Fig. 1 taken to the left of the dotted line II—II, in which the modulator is supplied with waves of selected frequency.

Fig. 2 shows an arrangement of tuned circuits intermediate between the circuits 5, 9, and 11, and the modulator 13, the tuned circuit 17 being resonant to a frequency $af$ selected from the complex wave $x_1 f$, the tuned circuit 18 being resonant to the frequency $b (N+1)f$ selected from the complex wave $x_2(N+1)f$, and the tuned circuit 19 being resonant to the frequency $c(N+1)^2 f$ selected from the complex wave $x_3(N+1)^2 f$. The output circuit of the modulator 13 contains the anti-resonant circuit 20 which is tuned to the frequency which it is desired to select from the output circuit of the modulator, other frequencies than the selected frequency being shunted through the circuit 20, thus being diverted from the amplifier 21 which reproduces the selected wave in the tuned output circuit 22 which is resonant to the selected frequency designated as $af \pm b(N+1)f \pm c(N+1)^2 f$.

In Fig. 3, fundamental oscillations generated by source 1 are impressed upon the input circuit 23 of the modulating device 24, designated as M, which functions as a distorting device to break up the fundamental wave derived from the source 1 into a distorted wave containing a number of harmonics. Connected to the output circuit 25 of the modulator 24 is the tuned circuit 26 which may be tuned to select the highest harmonic produced by the first distorting operation upon the wave disturbance derived from the source 1.

The wave selected by the tuned circuit 26 is reproduced by the amplifier 27 in the tuned circuit 28 which leads to an inductive coupling 29 in the input circuit 23 of the modulator 24 which may perform a second distorting operation, this time upon the wave derived through the tuned circuit 28. The new series of waves produced in the output circuit 25 are harmonic to the frequency of the wave from tuned circuit 28, and the wave from the source 1. The highest harmonic produced by the second described distorting operation, may be selected from the output circuit 25 by the branch tuned circuit 30 arranged in an amplifying channel similar to that containing the amplifier 27.

Another tuned circuit 31, resonant to the same frequency as tuned circuit 30 supplies a wave to the input circuit 23 and to the modulator 24 which may perform a third distorting operation, whereby said wave is distorted in the manner already described with reference to the first and second distorting operations. The highest harmonic produced by distorting the wave from the tuned circuit 31 may be selected from the output circuit 25 by a branch tuned circuit 32 in an amplifying channel similar to the one containing amplifier 27, and whose output circuit 33 supplies the selected wave to the input circuit 23 of the modulator 24. Tuned circuits 28, 31, etc. are provided to prevent the interaction of currents flowing in the circuit 29 upon the amplifying devices connected thereto, and to provide tuning means to supplement tuned circuits 26, 30, etc.

The above described process of selecting a given harmonic from the output circuit of a distorting device and feeding said harmonic back to the input circuit of the distorting device may be repeated in the manner already described with reference to three amplifying channels. In this way a single distorting device performs the function of a tandem connection of distorting devices. Although the operation has been described with reference to the selection during each cycle of the operation of the highest harmonic produced, it is obvious that the tuned branch circuits 26, 30, 32, etc. may be adjusted to select waves of other frequencies that may exist in the output circuit of the modulator 24. For example, tuned circuit 26 may be adjusted to be resonant to a frequency ten times that of the source 1; tuned circuit 30 may be adjusted to a frequency of ten times that of the circuit 26; tuned circuit 32 ten times that of the circuit 30, and so on, thereby giving rise to a series of harmonics related to each other by multiples and powers of ten.

In view of the distorting or modulating characteristic of the modulator 24, the various waves impressed upon the input circuit 23 will be intermodulated thus giving rise to all possible modulated combinations of the waves impressed upon the input circuit 23.

Instead of adjusting the tuned branch circuits 26, 30, 32, etc. to be resonant to a harmonic wave produced by simple distortion of an impressed sine wave, one or more of these circuits may be tuned to be resonant to a harmonic wave produced by the modulation of waves impressed upon the input circuit 23. A large number of combinations are thus obviously possible by varying the adjustment of these tuned branch circuits 26, 30, 32, etc.

Turned circuit 34 in the input circuit of the amplifier 35 and the tuned circuit 36 in the output circuit of the amplifier 35 may be tuned to any frequency of harmonic which it is desired to select from output circuit 25 of the modulator 24. Other harmonic frequencies may be selected by similar tuned amplifier circuits by making parallel connection with the tuned circuit 34 as shown by the conductors 37.

In Fig. 4, the source of fundamental oscillations 1 provides a wave disturbance which is passed through the tandem connection of harmonic producers 2, 6, and 10 having tuned circuits 4, 8 and 38 in their respective output circuits. Branch circuits 5 and 9 lead to tuned circuits 17 and 18, respectively, which supply selected harmonic waves to the input circuit 39 of the modulator 40 whose tuned output circuit 41 cooperates with tuned circuit 38 in supplying selected waves to the input circuit 42 of the modulator 43. To the output circuit 44 of modulator 43 may be connected one or more tuned amplifier circuits similar to that shown comprising the tuned circuit 45 in the input circuit of the amplifier 46, the tuned circuit 47 in the output circuit of the amplifier 46 being tuned to the same frequency as the circuit 45.

Modulator 40, designated as $M_1$, combines harmonics selected by the tuned circuits 17 and 18 to produce a complex wave containing, in addition to the waves impressed by the circuits 17 and 18, waves of modulated frequency which are different from those to be found in the circuits of the harmonic producers 2, 6, and 10.

A wave of frequency corresponding to second order modulation may be selected by the tuned circuit 41 and supplied with another harmonic wave from the tuned circuit 38 to the modulator 43 which produces modulated waves in its output circuit having frequencies correspondng to those produced in the output circuit of the modulator 13 in the system shown in Fig. 2. In other words harmonic waves corresponding to third order modulation in the system of Fig. 2 are produced by the system in Fig. 4 by operations involving only second order modulation. If desired, the system of Fig. 4 might be still further extended in the manner shown by combining higher harmonics than produced by the harmonic producer 10 with a wave selected from the output circuit 44 of the modulator 43, and so on.

The method of generating harmonic frequency waves described, with reference to the figures of the drawing, is obviously not limited to the specific modifications shown, nor are the modifications, as shown, to be construed as limited in their capacity to produce harmonics to the specific number of harmonics indicated, but the method of producing harmonic frequencies may be indefinitely extended by adding more harmonic producers, tuned circuits, and modulators to the output circuit of any of the modifications shown.

It is considered that the described method of generating harmonic frequency waves is of broad application, and not limited to any particular combination of elements, and the combinations of elements disclosed are considered to be only examples of specific embodiments of the invention.

The appended claims are intended to cover the invention broadly without being limited to the specific means described.

What is claimed is

1. The method of producing a required harmonic electric wave which consists in distorting the fundamental wave, and then synthesizing portions of said distorted wave having different modes of variation to form the required wave.

2. The method of producing a required harmonic electric wave which consists in distorting the fundamental wave while said wave is maintained independent of other waves, and then distorting the resultant wave by combining a plurality of the components of said resultant wave to form the wave of the required frequency.

3. The method of producing an electric wave of required frequency ratio to that of a given wave which consists in distorting said given wave into a wave containing a plurality of components of different frequencies, and uniting a plurality of said components to form a resultant wave containing the wave of required frequency.

4. The method of producing a required harmonic electric wave which consists in breaking up the fundamental wave to form a wave containing harmonics and intermodulating certain of said harmonics derived from said fundamental wave.

5. The method of producing a required harmonic of a fundamental electric wave of a higher order than is obtainable in a single operation, which consists in passing a wave disturbance initiated by said fundamental wave through a plurality of progressive stages of distorting operations and combining waves selected at different stages to form the required wave.

6. The method of producing a required harmonic electric wave of a higher order than is obtainable from a single distorting operation which consists in distorting a fundamental wave, distorting the highest available component in the distorted wave, repeating the last stated operation until the order of harmonics produced is approximately that of the required wave, selecting waves produced in certain of said distorting operations, and combining said selected waves to form the required wave.

7. The method of producing an electric wave of required harmonic frequency which comprises distorting a wave derived from a source of fundamental frequency, distorting a wave selected from the distorted wave, repeating the last stated process, and combining waves of frequency ranging between the fundamental frequency and the highest frequency produced to form the required waves.

8. The method of producing a required harmonic electric wave which consists in distorting the fundamental wave, distorting a portion of said first distorted wave, synthesizing a portion of said first distorted wave and said second distorted wave, distorting a portion of said second distorted wave, and combining a portion of said synthetic wave and said third distorted wave to form the required wave.

9. The method of producing a required harmonic electric wave which consists in progressively passing an electric disturbance through a series of distorting operations, synthesizing waves selected in certain of said operations, and combining certain of the synthetic waves with certain of the distorted waves to form the required wave.

10. The method of transforming a wave of fundamental frequency into a series of required waves separated by predetermined frequency intervals, which consists in progressively passing an electric disturbance derived from a wave of fundamental frequency through a plurality of distorting operations in seriatim, selecting certain of the required waves from those produced in said distorting operations, and combining certain of the waves produced in said distorting operations to form other of the required waves.

11. A generator of harmonic electric waves including a source of fundamental waves, a harmonic producer connected thereto, and a modulator connected to said producer and means for combining certain of the harmonics produced.

12. A generator of harmonic electric waves including a source of fundamental waves, a plurality of harmonic producers in tandem connected thereto, a modulator connected to said producers and means for combining certain of the harmonics produced.

13. A generator of harmonic waves including a source of fundamental waves, a plurality of harmonic producers in tandem connected thereto, a modulator connected to certain of said producers, and frequency-selecting means connected between said producers and said modulator.

14. A generator of harmonic electric waves including a source of fundamental waves, a first harmonic producer connected thereto, a tuned circuit connected to said first harmonic producer, a second harmonic producer connected to said tuned circuit, and a modulator connected to both of said harmonic producers to modulate waves derived therefrom.

15. A generator of harmonic electric waves including a source of fundamental waves, a first harmonic producer connected thereto, a tuned circuit connected to said first harmonic producer, a second harmonic producer connected to said tuned circuit, a modulator connected to both of said harmonic producers to modulate waves derived therefrom, and tuned circuits inserted between said harmonic producers and said modulator.

16. In a harmonic electric wave producer system, a tandem connection of harmonic producers, a tandem connection of modulators, and branch connections from certain of said harmonic producers to certain of said modulators.

In witness whereof, I hereunto subscribe my name this 20th day of December, A. D. 1920.

JOSEPH W. HORTON.